US009028787B2

(12) United States Patent
Ravishankar et al.

(10) Patent No.: US 9,028,787 B2
(45) Date of Patent: May 12, 2015

(54) PREVENTING OR REDUCING SCALE IN WET-PROCESS PHOSPHORIC ACID PRODUCTION

(75) Inventors: Sathanjheri A. Ravishankar, Shelton, CT (US); Bing Wang, Brookfield, CT (US)

(73) Assignee: Cytec Technology Corp., Wilmington, DE (US)

( * ) Notice: Subject to any disclaimer, the term of this patent is extended or adjusted under 35 U.S.C. 154(b) by 530 days.

(21) Appl. No.: 12/888,861

(22) Filed: Sep. 23, 2010

(65) Prior Publication Data

US 2011/0076219 A1    Mar. 31, 2011

Related U.S. Application Data

(60) Provisional application No. 61/245,713, filed on Sep. 25, 2009.

(51) Int. Cl.
    C01B 25/16    (2006.01)
    B03D 3/06     (2006.01)
    C01F 1/00     (2006.01)
    C01B 25/22    (2006.01)

(52) U.S. Cl.
    CPC ..................................... C01B 25/22 (2013.01)

(58) Field of Classification Search
    None
    See application file for complete search history.

(56) References Cited

U.S. PATENT DOCUMENTS

| | | | |
|---|---|---|---|
| 3,062,612 A | | 11/1962 | Le Boucher |
| 3,251,778 A | | 5/1966 | Dickson et al. |
| 3,258,428 A | | 6/1966 | Dickson et al. |
| 3,317,431 A | | 5/1967 | Saul |
| 3,553,101 A | | 1/1971 | Foroulis |
| 3,714,330 A | * | 1/1973 | Barker ................... 423/321.1 |
| 3,796,790 A | | 3/1974 | Sirianni et al. |
| 3,835,215 A | | 9/1974 | Marquis et al. |
| 3,904,493 A | * | 9/1975 | Losi et al. ................ 205/240 |
| 3,931,038 A | | 1/1976 | Mochi-Bartolani et al. |
| 3,972,981 A | * | 8/1976 | Harper et al. ........... 423/320 |
| 4,049,774 A | | 9/1977 | Harper et al. |
| 4,221,769 A | | 9/1980 | Harper et al. |
| 4,277,359 A | * | 7/1981 | Lipinski ................... 252/181 |
| 4,327,061 A | | 4/1982 | Hermann et al. |
| 4,341,638 A | * | 7/1982 | Berry et al. .............. 210/666 |
| 4,554,090 A | | 11/1985 | Jones |
| 4,563,284 A | * | 1/1986 | Amjad ..................... 210/699 |
| 4,986,970 A | * | 1/1991 | Haraldsen ................ 423/321.1 |
| 5,022,926 A | | 6/1991 | Kreh et al. |
| 5,080,801 A | * | 1/1992 | Molter et al. ............. 210/699 |
| 5,120,519 A | | 6/1992 | Gross |
| 5,256,303 A | | 10/1993 | Zeiher et al. |
| 5,456,767 A | | 10/1995 | Shah et al. |
| 5,575,920 A | * | 11/1996 | Freese et al. ............. 210/697 |
| 5,764,717 A | | 6/1998 | Rootham |
| 5,993,668 A | | 11/1999 | Duan |

FOREIGN PATENT DOCUMENTS

| | | |
|---|---|---|
| CN | 1724965 | 1/2006 |
| CN | 1762857 | 4/2006 |
| CN | 1762857 A | 4/2006 |
| EP | 0271035 B1 | 9/1993 |
| EP | 0677485 A1 | 10/1995 |
| GB | 1406884 A | 9/1975 |
| GB | 1433123 A | 4/1976 |
| GB | 2424876 A | 10/2006 |
| JP | 2002263690 A | 9/2002 |
| WO | 2004083118 A1 | 9/2004 |
| WO | 2009148866 A1 | 12/2009 |
| WO | 2011038108 A1 | 3/2011 |
| WO | 2012128755 A1 | 9/2012 |

OTHER PUBLICATIONS

Frazier, A.W. et al., "Chemical Behavior of Fluorine in Production of Wet-Process Phosphoric Acid," National Fertilizer Development Center, Division of Chemical Development, Tennessee Valley Authority, Muscle Shoals, AL, vol. 11, Oct. 10, 1977, pp. 1007-1014.
International Search Report and Written Opinion for PCT/US2010/050086, mailing date of Feb. 10, 2011.
International Search Report and Written Opinion for PCT/US2010/049983, mailing date of Feb. 4, 2011.
International Search Report and Written Opinion for PCT/US2011/029319, mailing date of Dec. 5, 2011.
Office Action of U.S. Appl. No. 12/888,853, mailing date of Oct. 5, 2012.
Office Action of U.S. Appl. No. 13/053,988, mailing date of Jul. 19, 2012.
El-Shall H. et al, "Decreasing Iron Content in Wet-Process Phosphoric Acid: Final Report;" Florida Institute of Phosphate Research, Publication No. 01-154-171, Feb. 2001.
Wang et al., "Enhanced Solubility of Sodium Fluorosilicate Scale by Magnetic Treatment;" Florida Scientist (1998); 61 (1); pp. 17-25.
Pandey, A.D. et al., "Prevention of Scale Deposition on Heat Exchanger Surfaces by Use of High Intensity Ultrasonic Waves during Concentration of Wet Process Phosphoric Acid;" Fertiliser News; Jun. 1983; 28 (6); pp. 45-48.
Final Office Action of U.S. Appl. No. 13/053,988, mailing date of Mar. 28, 2013.
Non-final Office Action of U.S. Appl. No. 13/053,988, mailing date of Nov. 8, 2013.
Non-final Office Action of U.S. Appl. No. 12/888,853, mailing date of Aug. 7, 2013.
A. William Frazier et al., "Chemical Behavior of Fluorine in Production of Wet-Process Phosphoric Acid;" Environmental Science & Technology; vol. 11; No. 10; Oct. 1977; pp. 1007-1014.
Lin-Jun Yang et al., "Effect of Scale Inhibitor—Dispersant on the Crystallization of Potassium (Sodium) Fluosilicate," Chemical Industry and Engineering; vol. 19, No. 1; 2002 (abstract).
Final Rejection of U.S. Appl. No. 12/888,853; mailing date of Jun. 5, 2014.

* cited by examiner

Primary Examiner — Melvin C Mayes
Assistant Examiner — Michael Forrest
(74) Attorney, Agent, or Firm — Charles E. Bell

(57) ABSTRACT

Methods for preventing or reducing the formation of scale in a wet-process phosphoric acid production process by intermixing a water-soluble functional organic reagent with a phosphoric acid at one or more step of the phosphoric acid production process in an amount sufficient to prevent or reduce at least one species of scale are provided.

14 Claims, No Drawings

US 9,028,787 B2

PREVENTING OR REDUCING SCALE IN WET-PROCESS PHOSPHORIC ACID PRODUCTION

CROSS-REFERENCE TO RELATED APPLICATIONS

This application claims benefit of priority from U.S. Provisional Application No. 61/245,713, filed Sep. 25, 2009 the content of which is incorporated herein by reference in its entirety.

This application is also related to, without benefit of priority, U.S. application Ser. No. 12/888,853, filed Sep. 23, 2010, and U.S. application Ser. No. 13/053,988, filed Mar. 22, 2011.

BACKGROUND OF THE INVENTION

1. Field of the Invention

The invention relates to formulated reagents and methods for preventing or reducing scale formation in and/or on production equipment at the different stages of the phosphoric acid production process.

2. State of the Art

Although phosphoric acid can be prepared by three routes—the thermal process, the wet process, and the dry kiln process—the wet process is the most commonly-used process in phosphoric acid production. In the process, calcium phosphate rocks, which contain mostly calcium phosphate, are cleaned in the wash plant and grinded in the Ball mill before fed into a series of reactors for digestion with sulfuric acid along with recycled phosphoric acid from the process. The digestion temperature typically ranges from 40° C. to 80° C. After completing the reaction series, the process stream is washed with evaporator condensate while being forced through a filter.

After digestion, the reaction slurry is filtered to separate phosphoric acid from Gypsum (calcium sulfate). The filtered, crude phosphoric acid is then sent to Clarifiers and Evaporators for further purification and concentration. The purified phosphoric acid is either sent out as Merchant Grade Acid (MGA) or continued to make 69% $P_2O_5$ Super Phosphoric Acid (SPA). The Gypsum is washed and dried before being sold for commercial uses. Some of the crude phosphoric acid is concentrated to 44% ($P_2O_5$) before sent for Monoammonium Phosphate (MAP), Diammonium Phosphate (DAP) and ammonium phosphate-sulfate (APS) production.

Due to the supersaturated nature of the acid and the impurities in the phosphate ores, the concentration steps with respect to $P_2O_5$ render several side reactions, causing scale formation in and/or on the equipment at different stages of the phosphoric acid production. For example, fluorosilicate is one of the more common scale species found in phosphoric acid production. It can be depicted by the following equations:

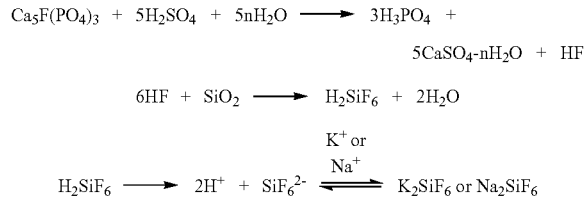

More than 12-15 other types of scaling species can be found throughout the phosphoric acid production process and they pose significant challenges for the industry. Plants normally have to shut down production every few weeks to physically clean up the scale using high pressure water and/or mechanical means. The economic impact for the scale-related issues is substantial, and the industry is in need of a more efficient scale prevention technology than the existing physical means of post scale formation removal.

Conceptually, there are two basic types of approaches scale removal from the phosphoric acid production process—namely, the physical method and the chemical method. There are several options for the physical method. In addition to the previously mentioned mechanical and water wash method, magnetic separation (Wang, Chuhua; Benson, Robert F.; Martin, Dean F. *Enhanced solubility of sodium fluorosilicate scale by magnetic treatment*, Florida Scientist (1998), 61(1), 17-25) and ultrasonic methods (Pandey, A. D.; Mallick, K. K.; Pandey, P. C.; Varma, S. *Prevention of scale deposition on heat exchanger surfaces by use of high intensity ultrasonic waves during concentration of wet process phosphoric acid*, Fertiliser News (1983), 28(6), 45-8) have also been used as part of the physical approach. Another approach still, is available by using physically smoothed piping in phosphoric acid production (See DE 3039187).

With regard to the chemical method, this approach is normally done by adding reagents to change the degree of supersaturation, either to induce precipitation before filtration, or to prevent scale from forming. This is the preferred approach because it requires a limited amount of capital investment and does not alter the existing process in the phosphoric acid plants. It also does not require a large amount of reagent and is therefore considered both environmental, and to have a minimal impact downstream.

However, most of the existing work addressing the scale problem in phosphoric acid production plants is based on the work for addressing scale issues in water boiler system. Some examples for scale treatment in boiler water are such as copolymers of acrylic acid and 2-acrylamido-2-methylpropane sulfonic acid (AMPS) (EP0271035). These polymers were reported to reduce the amount of silica gel adhering to the wall of the testing bottles. Other systems such as polyamine, phosphonic acid and carboxylic acid based monomers and polymers have also shown effectiveness in scale removal in boiler water system (See, e.g., GB2424876, JP2002263690, and EP0677485).

Because water boiler systems differ vastly from the wet-process phosphoric acid production environment, this system does not provide the best model for use in the phosphoric acid production process. The water boiler systems usually have mild condition with a pH in the range of 8 to 9, and a low concentration of dissolved salts. The wet-process phosphoric acid production environment, by contrast, normally contains acid conditions with a low pH and a high solid content. Additionally, the scale in phosphoric acid plants have much more complicated components—containing more than 15 known species, such as $Na_2SiF_6$, $K_2SiF_6$, $CaSiF_6 \cdot 2H_2O$, $CaF_2$, $MgF_2$, $CaSO_4 \cdot 2H_2O$ (Gypsum), $MgSiF_6 \cdot 6H_2O$, $Mg_{0.8}Al_{1.5}F_6 \cdot XH_2O$ (wherein X is a variable integer), $MgH_2P_6O_7$, $CaSO_4$, $Al(PO_3)_3$, $NaK_2AlF_6$, $Ca_3(AlF_6)_2 \cdot 4H_2O$, $MgNaAlF_6 \cdot 2H_2O$, $Ca_4SO_4AlSiF_{13} \cdot 10H_2O$ (see for example, A. William Frazier, James R. Lehr, and Ewell F. Dillard, Environmental Science 8. Technology, 11, 1007, 1977). Moreover, different phosphoric acid plants experience different types of scale, and even within one plant, the type of scale can differ greatly from one location of the process to the other. Due to the complexity of the scale forming issues, it is a great challenge to develop scale inhibition reagents for use in preventing and/or reducing scale in phosphoric acid plants.

For example, in a typical 52% phosphoric acid production, a 60 torr vacuum is applied in a boiler and 85° C. phosphoric acid is circulating and heated up by a heat exchanger at 130° C. During this evaporation process, some scale is formed either at the boiler or at the heat exchanger. However, the scale formed at the boiler can be different than that formed at the heat exchanger. The slow forming scale such as that formed at the heat exchanger, contain mostly magnesium fluoro-aluminates; while the fast forming scale such as that formed on pipes, contain mostly sodium or potassium fluorosilicate.

Yet, there is very little information in addressing the phosphoric acid plant scale issue in an industrial setting. Even for academic studies, the results are scattered. For example, several articles mention reagents for fluorosilicate inhibition in phosphoric acid production. (See L. Yang, Zhang Y., Huang, Y. Chemical Industry and Engineering (China), (2002), V 19(1), 1). Chinese patent CN1762857 discloses that mixtures of phosphonic acids, polymers, and pesticides can effectively reduce the scale formation in wet-process phosphoric acid production. U.S. Pat. No. 5,120,519 discloses that high molecular weight polyacrylamide and polyacrylic acid can prevent scale from adhering on the surface of the phosphate rock and phosphoric acid. However, the use of most of these chemicals is not new and has been applied in the water treatment system for scale control, and the mechanism of these reagents is based mostly on their dispersant effect.

Accordingly, the compositions and methods presently available for preventing and/or reducing scale in the phosphoric acid production process require further improvement. Compositions and formulations that effectively prevent and/or reduce scale, thereby enabling the phosphoric acid production plant to run longer without shutting down to remove scale would be a useful advance in the art and could find rapid acceptance in the industry.

SUMMARY OF THE INVENTION

It has now been discovered that certain formulated, water-soluble organic reagents are useful for preventing and/or inhibiting multiple species of scale formation in and/or on production equipment at various stages of the wet-process phosphoric acid production. Such formulated reagents extend the production time for making phosphoric acid by reducing the frequency of the washing/shut down time to remove scale, thereby improving the overall productivity of the equipment and plant.

Accordingly, in one aspect, the invention provides methods for preventing or reducing at least one species of scale in a wet-process phosphoric acid production process by adding at one or more steps of the production process a water-soluble, functional organic reagent chosen from one or more of: a phosphonic acid derivative; sulfonic acid or a corresponding derivative; a carboxylic acid derivative; a phosphate derivative; a co-polymer having a first component chosen from any of the preceding reagents and a second component chosen from a suitable polymer, in an amount sufficient to prevent or reduce the scale, provided that the phosphonic acid derivative is not chosen from: amino-tri(methylene phosphonic acid) (ATMPA); 1-hydroxyethylidene-1,1-diphosphonic acid (HEDPA); diethylenetriamine-penta(methylene phosphonic acid) (DTPMP); ethylenediamine methylene phosphonic acid (EDTMP); hydroxylethane phosphonothyl acetic acid (HPAA); and phosphonobutane-1,2,4-tricarboxylic acid (PBTCA). In certain embodiments, the reagent can also be blended with various polymers, which are known to those skilled in the art to which the invention pertains.

These and other objects, features and advantages of this invention will become apparent from the following detailed description of the various aspects of the invention taken in conjunction with the accompanying Examples.

DETAILED DESCRIPTION OF CERTAIN EMBODIMENTS OF THE INVENTION

As summarized above, the present invention is based in part on the use of water-soluble functional organic reagents for use in preventing or reducing scale formed in and/or on the production equipment in the phosphoric acid production process.

Definitions

As employed above and throughout the disclosure, the following terms are provided to assist the reader. Unless otherwise defined, all terms of art, notations and other scientific or industrial terms or terminology used herein are intended to have the meanings commonly understood by those of skill in the chemical arts. In some cases, terms with commonly understood meanings are defined herein for clarity and/or for ready reference, and the inclusion of such definitions herein should not necessarily be construed to represent a substantial difference over the definition of the term as generally understood in the art unless otherwise indicated. As used herein and in the appended claims, the singular forms include plural referents unless the context clearly dictates otherwise.

Throughout this specification, the terms and substituents retain their definitions. A comprehensive list of abbreviations utilized by organic chemists (i.e. persons of ordinary skill in the art) appears in the first issue of each volume of the *Journal of Organic Chemistry*. The list, which is typically presented in a table entitled "Standard List of Abbreviations" is incorporated herein by reference.

As used herein the term "phosphonic acid derivative," "sulfonic acid derivative," and "carboxylic acid derivative" refer to compounds having a functional phosphonic acid, sulfonic acid, or carboxylic acid group, respectively, in the compound. Where a phosphonic acid or sulfonic acid appear together with a carboxylic acid in the same compound, the compound will be termed a phosphonic acid derivative or sulfonic acid derivative as the case may be. For example, sulfosuccinic acid is considered a sulfonic acid derivative for purposes of this application. Similarly, phosphonoacetic acid and 2-phosphonobutane-1,2,4-tricarboxylic acid (PBTCA) are considered phosphonic acid derivatives for purposes of this application.

The term "copolymer" as used herein refers to a polymer composed of two or more different components, wherein the components are linked randomly or in repeating sequences, or in blocks, or as side chains off the main chain. Accordingly, a phosphonic acid derivative copolymer, for example, refers to a copolymer having a phosphonic acid derivative component (i.e., a first component) linked randomly or in repeating sequence with one or more other component (i.e., a second component). Those of ordinary skill in the art will appreciate that there are a variety of different components (i,e., monomers, polymers, copolymers) known to them that could be used as a second component to form a copolymer according to the invention. Sulfonic acid copolymer or sulfonic acid derivative copolymers, etc. are similarly formed.

As used herein, and as would be understood by the person of skill in the art, the recitation of "a reagent" is intended to include salts and solvates of that reagent as well as any stereoisomeric form, or a mixture of any such forms of that reagent in any ratio.

When the reagents of the present invention are basic, salts may be prepared from acceptable non-toxic acids including inorganic and organic acids. Suitable acid addition salts for the reagents of the present invention include acetic, benzenesulfonic (besylate), benzoic, camphorsulfonic, citric, ethenesulfonic, fumaric, gluconic, glutamic, hydrobromic, hydrochloric, isethionic, lactic, maleic, malic, mandelic, methanesulfonic, mucic, nitric, pamoic, pantothenic, phosphoric, succinic, sulfuric, tartaric acid, p-toluenesulfonic, and the like. When the reagents contain an acidic side chain, suitable acceptable base addition salts for the reagents of the present invention include metallic salts made from aluminum, calcium, lithium, magnesium, potassium, sodium and zinc or organic salts made from lysine, N,N'-dibenzylethylenediamine, diethanolamine, and ethylenediamine.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. Additionally, each numerical parameter should be construed in light of the number of significant digits and ordinary rounding approaches.

Scale from the phosphoric acid production process forms on heat exchangers, evaporators, concentrators, and pipes during the repetitive flashing/cooling/concentrating process of the phosphoric acid production process. A scale inducing system was set up to mimic this process, whereby hot or cold water is fed through a stainless steel tube while the tube is submerged in hot phosphoric acid solution. The temperature gradient and free flowing solid causes the formation of scale on the outside of the tube. This system is the basis for the corresponding Examples provided herein, and it also uses a control flask under identical environment for comparison to the sample flask.

Methods

In a first aspect, the invention provides methods for preventing or reducing at least one species of scale in a wet-process phosphoric acid production process, the method comprising: adding at one or more step of the phosphoric acid production process a water-soluble functional organic reagent chosen from one or more of: a phosphonic acid derivative; sulfonic acid or a corresponding derivative; a carboxylic acid derivative; a phosphate derivative; a co-polymer having a first component chosen from any of the preceding reagents and a second component chosen from any suitable polymer, in an amount sufficient to prevent or reduce the scale, provided that the phosphonic acid derivative is not chosen from: amino-tri(methylene phosphonic acid) (ATMPA); 1-hydroxyethylidene-1,1-diphosphonic acid (HEDPA); diethylenetriamine-penta(methylene phosphonic acid) (DTPMP); ethylenediamine methylene phosphonic acid (EDTMP); hydroxylethane phosphonothyl acetic acid (HPAA); and phosphonobutane-1,2,4-tricarboxylic acid (PBTCA).

In one embodiment, the species of scale prevented or inhibited from forming during the phosphoric acid production process includes, but is not limited to, one or more of: $Si_2F_6$; $Na_2SiF_6$; $K_2SiF_6$; $CaSiF_6/2H_2O$; $CaF_2$; $MgF_2$; $CaSO_4/2 H_2O$; $MgSiF_6/6 H_2O$; $Mg_{0.8}Al_{1.5}F_6/X H_2O$ (wherein X is an integer ranging from 2 to 20); $MgH_2P_6O_7$; $CaSO_4$; $Al(PO_3)_3$; $NaK_2AlF_6$; $Ca_3(AlF_6)_2/4 H_2O$; $MgNaAlF_6/2 H_2O$; and $Ca_4SO_4AlSiF_{13}/10 H_2O$.

In some embodiments, the water-soluble functional organic reagents can be added at any step of the phosphoric acid production process, which steps are well known to those skilled in the art. In certain embodiments, for example, the adding step occurs at one or more of the milling step; the digesting step; the filtering step; the clarifying step; and the condensation/evaporation step of the phosphoric acid production process. In one embodiment the adding step occurs after the digesting step of the phosphoric acid production process. In another embodiment, the adding step occurs at the condensation/evaporation step of the process.

The reagent(s) may be intermixed in various ways, e.g., in a single stage, in multiple stages, sequentially, in reverse order, simultaneously, or in various combinations thereof. For example, in one embodiment, the reagent is added to form a pre-mix, then intermixed with the phosphoric acid. In another embodiment, the reagent is formed in situ by separately intermixing the components of the reagent with the phosphoric acid. Various modes of addition will be found to be effective.

The reagents that comprise a liquid (such as water, oil and/or alcohol) may be formulated in various ways, e.g., the solid reagent may be suspended (e.g., colloidal suspension), dispersed and/or slurried in the liquid, and/or the reagent may be suspended, dispersed, slurried and/or dissolved in the liquid. In one embodiment, the reagent is added separately to the phosphoric acid solution. In another embodiment, the reagent is premixed and added together to the phosphoric acid solution.

In one embodiment, the concentration of the water-soluble functional organic reagent is from 10 to 1000 g per ton of phosphoric acid (e.g., 10 g/ton, 20 g/ton, 30 g/ton, 40 g/ton, 50 g/ton, 60 g/ton, 70 g/ton, 80 g/ton, 90 g/ton, 100 g/ton, 110 g/ton, 120 g/ton, 130 g/ton, 140 g/ton, 150 g/ton, 160 g/ton, 170 g/ton, 180 g/ton, 190 g/ton, 200 g/ton, 210 g/ton, 220 g/ton, 230 g/ton, 240 g/ton, 250 g/ton, 260 g/ton, 270 g/ton, 280 g/ton, 290 g/ton, 300 g/ton, 310 g/ton, 320 g/ton, 330 g/ton, 340 g/ton, 350 g/ton, 360 g/ton, 370 g/ton, 380 g/ton, 390 g/ton, 400 g/ton, 410 g/ton, 420 g/ton, 430 g/ton, 440 g/ton, 450 g/ton, 460 g/ton, 470 g/ton, 480 g/ton, 490 g/ton, 500 g/ton, 510 g/ton, 520 g/ton, 530 g/ton, 540 g/ton, 550 g/ton, 560 g/ton, 570 g/ton, 580 g/ton, 590 g/ton, 600 g/ton, 610 g/ton, 620 g/ton, 630 g/ton, 640 g/ton, 650 g/ton, 660 g/ton, 670 g/ton, 680 g/ton, 690 g/ton, 700 g/ton, 710 g/ton, 720 g/ton, 730 g/ton, 740 g/ton, 750 g/ton, 760 g/ton, 770 g/ton, 780 g/ton, 790 g/ton, 800 g/ton, 810 g/ton, 820 g/ton, 830 g/ton, 840 g/ton, 850 g/ton, 860 g/ton, 870 g/ton, 880 g/ton, 890 g/ton, 900 g/ton, 910 g/ton, 920 g/ton, 930 g/ton, 940 g/ton, 950 g/ton, 960 g/ton, 970 g/ton, 980 g/ton, 990 g/ton, 1000 g/ton of phosphoric acid). In another embodiment, the concentration of the water-soluble functional organic reagent is from 50 to 300 g/ton of phosphoric acid. In a preferred embodiment, the concentration of the water-soluble functional organic reagent is 100 g/ton of phosphoric acid.

The treatment times may vary, depending in many cases on the nature of the scale formation rate and/or the species of the scale. For example, if the scale is formed within 30 minutes of the treatment, the overall treatment time may be just one hour. If the scale is not formed within 4 hours of the treatment, the overall treatment time may be over one day. One of ordinary skill in the art would be able to determine the applicable treatment time through routine means.

In one embodiment, the scale formed in the phosphoric acid production process is prevented or reduced from 10 to 180 days, depending on the amount and type of scale.

The pH of the phosphoric acid, although not adjusted, should not be altered by a value of 1 after the addition of the reagent for treatment. The preferred pH of the phosphoric acid should be in the range of 1-5 before starting the method of the invention. In case the pH of the phosphoric acid dropped below 1, it can be adjusted by sodium hydroxide or soda ash. In case the pH of the phosphoric acid rose above 5, it can be adjusted by addition of sulfuric acid or phosphoric acid.

In one embodiment, the water-soluble functional organic reagent is a phosphonic acid derivative chosen from: phenylphosphonic acid; phosphonoacetic acid; hydroxyethylamino-di(methylene phosphonic acid) (HEMPA); and mixtures thereof.

In another embodiment, the water-soluble functional organic reagent is a sulfonic acid derivative chosen from: sulfosuccinic acid; 5-sulfosalicylic acid hydrate; 4-sulfophthalic acid; N-(1,1-dimethyl-2-hydroxyethyl)-3-amino-2-hydroxypropanesulfonic acid (AMPSO); 3-amino-4-hydroxybenzenesulfonic acid; 1-dodecanesulfonic acid sodium salt; 3-sulfopropyl acrylate potassium salt; 4-hydroxybenzenesulfonic acid solution; 4,5-dihydroxynaphthalene-2,7-disulfonic acid disodium salt; hydroquinonesulfonic acid potassium salt; and mixtures thereof.

In still another embodiment, the water-soluble functional organic reagent is a carboxylic acid derivative chosen from: 3,4-dihydroxyhydrocinnamic acid; 3,4-dihydroxybenzoic acid; gallic acid; caffeic acid; tartaric acid; and mixtures thereof.

In a further embodiment, the water-soluble functional organic reagent is a co-polymer comprising a phosphonic acid derivative, a sulfonic acid or corresponding derivative, a carboxylic acid derivative, or a phosphite derivative as a first component and a second component chosen from any suitable polymer including, but not limited to: polyethyleneimine; acrylamide/acrylate copolymer (CYANAMER P-70®) (available from Cytec Industries Inc., Woodland Park, N.J.); allyl sulfonic acid/maleic anhydride copolymer (CYANAMER P-80®)(available from Cytec Industries Inc., Woodland Park, N.J.); poly-dimethylamine ephichlorohydrin ehtylenediamine (SUPERFLOC® C573), poly-diallyl dimethyl ammonium chloride (SUPERFLOC® C587)(available from Cytec Industries Inc., Woodland Park, N.J.); poly(4-styrenesulfonic acid); phosphinopolycarboxylic acid; acrylic acid/acrylate/sulfonate co-polymer; polyacrylic acid (PAA); sodium polyacrylate (PAAS); methoxyphenyl maleamic acid (MPMA); maleic anhydride acrylic acid polymer (MA-AA); AA-MA-acrylamido-methyl-propane sulfonate polymer (AMPS) hypophosphorous acid quadripolymer; AA-AMPS multipolymer; AA-acrylate copolymer T-225; and acrylic acid-2-methyl propanesulfonic acid acrylic polymer; and mixtures thereof. In certain embodiments, any of the reagents and/or co-polymers can be further blended with a suitable polymer such as those described herein.

Preferred reagents for use in the methods of the invention include, for example, one or more of phosphonoacetic acid; tannic phosphite; hydroxyethylamino-di(methylene phosphonic acid) (HEMPA); sulfonic acid; sulfosuccinic acid; 5-sulfosalicyclic acid hydrate; N-(1,1-dimethyl-2-hydroxyethyl)-3-amino-2-hydroxypropanesulfonic acid (AMPSO); 3-sulfopropyl acrylate potassium salt; 1-dodecanesulfonic acid sodium salt; 4-hydroxybenzenesulfonic acid solution; 4,5,-dihydroxynaphthalene-2,7-disulfonic acid disodium salt; 3,4-dihydroxyphenylacetic acid; 3,4-dihydroxyhydrocinnamic acid; 3,4-dihydroxybenzoic acid; tartaric acid; polyethyleneimine-epoxy-hydroxysuccinate; and mixtures thereof.

In certain embodiments, the method can further include one or more step of flocculating the phosphoric acid with a flocculating agent; leaching the phosphoric acid with a leaching agent; precipitating the phosphoric acid with a precipitation agent; and filtering the phosphoric acid. Typical agents for use with these additional steps are known to those of ordinary skill in the art.

Other Embodiments

1. A method for preventing or reducing at least one species of scale in a wet-process phosphoric acid production process, the method comprising:
  adding at one or more steps of the phosphoric acid production process a reagent chosen from one or more of:
    i) a phosphonic acid derivative;
    ii) sulfonic acid or a corresponding derivative;
    iii) a carboxylic acid derivative;
    iv) a phosphite derivative; and
    v) a copolymer comprising a first component chosen from (i)-(iv) and a second component;
  in an amount sufficient to prevent or reduce said scale,
  with the proviso that the phosphonic acid derivative is not chosen from: amino-tri(methylene phosphonic acid) (AT-MPA); 1-hydroxyethylidene-1,1-diphosphonic acid (HEDPA); diethylenetriamine-penta(methylene phosphonic acid) (DTPMP); ethylenediamine methylene phosphonic acid (EDTMP); hydroxylethane phosphonothyl acetic acid (HPAA); and phosphonobutane-1,2,4-tricarboxylic acid (PBTCA).

2. A method according to embodiment 1, wherein the species of phosphoric acid scale is chosen from one or more of: $Si_2F_6$; $Na_2SiF_6$; $K_2SiF_6$; $CaSiF_6/2\ H_2O$; $CaF_2$; $MgF_2$; $CaSO_4/2\ H_2O$; $MgSiF_6/6\ H_2O$; $Mg_{0.8}Al_{1.5}F_6/X\ H_2O$; $MgH_2P_6O_7$; $CaSO_4$; $Al(PO_3)_3$; $NaK_2AlF_6$; $Ca_3(AlF_6)_2/4\ H_2O$; $MgNaAlF_6/2\ H_2O$; and $Ca_4SO_4AlSiF_{13}/10\ H_2O$, wherein X is an integer ranging from 2 to 10.

3. A method according to any of the preceding embodiments, wherein the adding step occurs at one or more of: the milling step; the digesting step; the filtering step; the clarifying step; and the condensation/evaporation step of the phosphoric acid production process.

4. A method according to embodiment 3, wherein the adding step occurs after the digesting step of the phosphoric acid production process.

5. A method according to embodiment 3, wherein the adding step occurs at the condensation/evaporation step of the phosphoric acid production process.

6. A method according to any of the preceding embodiments, wherein the adding step is performed in a single stage, in multiple stages, sequentially, in reverse order, simultaneously, or in combinations thereof.

7. A method according to any of the preceding embodiments, wherein the reagent is added directly to the phosphoric acid or premixed with a solvent chosen from: water; oil; alcohol; and mixtures thereof.

8. A method according to embodiment 7, wherein the reagent is premixed with a solvent and provided as a colloidal suspension, a dispersion, a slurry, or dissolved in the solvent.

9. A method according to any of the preceding embodiments, wherein the reagent is a phosphonic acid derivative chosen from: phenylphosphonic acid; phosphonoacetic acid; hydroxyethylamino-di(methylene phosphonic acid) (HEMPA); and mixtures thereof.

10. A method according to any of embodiments 1 to 8, wherein the reagent is a sulfonic acid derivative chosen from: sulfosuccinic acid; 5-sulfosalicylic acid hydrate; 4-sulfophthalic acid; N-(1,1-dimethyl-2-hydroxyethyl)-3-amino-2-hydroxypropanesulfonic acid (AMPSO); 3-amino-4-hydroxybenzenesulfonic acid; 1-dodecanesulfonic acid sodium salt; 3-sulfopropyl acrylate potassium salt; 4-hydroxybenzenesulfonic acid solution; 4,5-dihydroxynaphthalene-2,7-disulfonic acid disodium salt; hydroquinonesulfonic acid potassium salt; and mixtures thereof.

11. A method according to any of embodiments 1 to 8, wherein the reagent is a carboxylic acid chosen from: 3,4-dihydroxyphenylacetic acid; 3,4-dihydroxyhydrocinnamic acid; 3,4-dihydroxybenzoic acid; gallic acid; caffeic acid; tartaric acid; and mixtures thereof.

12. A method according to any of embodiments 1 to 8, wherein the reagent is a co-polymer and wherein the second component is chosen from: polyethyleneimine-epoxy-hydroxysuccinate; CYANAMER P-70®; CYANAMER P-80®; poly(4-styrenesulfonic acid); phosphinopolycarboxylic acid; acrylic acid/acrylate/sulfonate; polyacrylic acid (PAA); sodium polyacrylate (PAAS); methoxyphenyl maleamic acid (MPMA); maleic anhydride acrylic acid polymer (MA-AA); AA-MA-acrylamido-methyl-propane sulfonate polymer (AMPS) hypophosphorous acid quadripolymer; AA-AMPS multipolymer; AA-acrylate copolymer T-225; and acrylic acid-2-methyl propanesulfonic acid acrylic polymer; and mixtures thereof.

13. A method according to any of embodiments 1 to 12, wherein the reagent is chosen from: phosphonoacetic acid; hydroxyethylamino-di(methylene phosphonic acid) (HEMPA); tannic phosphite; sulfonic acid; sulfosuccinic acid; 5-sulfosalicylic acid hydrate; N-(1,1-dimethyl-2-hydroxyethyl)-3-amino-2-hydroxypropanesulfonic acid (AMPSO); 3-sulfopropyl acrylate potassium salt; 1-dodecanesulfonic acid sodium salt; 4-hydroxybenzenesulfonic acid solution; 4,5-dihydroxynaphthalene-2,7-disulfonic acid disodium salt; 3,4-dihydroxyphenylacetic acid; 3,4-dihydroxyhydrocinnamic acid; 3,4-dihydroxybenzoic acid; tartaric acid; polyethyleneimine-epoxy-hydroxysuccinate; and mixtures thereof.

14. A method according to any of the preceding embodiments, wherein the concentration of the reagent is from 10 to 1000 g per ton of phosphoric acid.

15. A method according to embodiment 14, wherein the concentration of the reagent is from 50 to 300 g per ton of phosphoric acid.

16. A method according to embodiment 15, wherein the concentration of the reagent is 100 g per ton of phosphoric acid.

17. A method according to any of the preceding embodiments, wherein the scale is prevented or reduced for a period of time from 10 to 180 days.

18. A method according to any of the preceding embodiments further comprising removing the scale-causing metal ions from the resulting phosphoric acid.

19. A method according to embodiment 18, wherein the removal step is performed by flocculating the phosphoric acid with one or more flocculating agent.

20. A method according to any of embodiments 18 to 19 further comprising leaching the phosphoric acid with one or more leaching agent.

21. A method according to any of embodiments 18 to 20 further comprising treating the phosphoric acid with one or more precipitation agent.

22. A method according to any one of embodiments 18 to 21 further comprising filtering the phosphoric acid.

23. A method for preventing or reducing at least one species of scale in a wet-process phosphoric acid production process, the method comprising:
adding at one or more steps of the phosphoric acid production process a reagent chosen from one or more of:

i) a phosphonic acid derivative chosen from phenylphosphonic acid; phosphonoacetic acid; hydroxyethylamino-di(methylene phosphonic acid)(HEMPA); and mixtures thereof;
ii) sulfonic acid or a derivative thereof;
iii) a carboxylic acid derivative;
iv) a phosphite derivative; and
v) a copolymer comprising a first component chosen from (i)-(iv) and a second component;
in an amount sufficient to prevent or reduce said scale.

24. A method for preventing or reducing at least one species of scale in a wet-process phosphoric acid production process, the method comprising:
adding at one or more steps of the phosphoric acid production process a reagent chosen from one or more of:
i) sulfonic acid or a corresponding derivative;
ii) a carboxylic acid derivative;
iii) a phosphite derivative; and
iv) a copolymer comprising a first compnent chosen from (i)-(iii) and a second component;
in an amount sufficient to prevent or reduce said scale.

EXAMPLES

The following examples are provided to assist one skilled in the art to further understand embodiments of the present invention. These examples are intended for illustration purposes and are not to be construed as limiting the scope of the embodiments of the present invention or the claims appended hereto.

Phosphoric acid solutions used for reagent testing are obtained from phosphoric acid plants such as Agrium, Inc. Canada (Plant A); Prayon, Inc., Georgia (Plant P); and The Mosaic Company, Florida (Plant M) at 28%, 42%, 52% or 69% $P_2O_5$. ICP and XRD analysis shows the crude phosphoric acids differ greatly in their metal components, and this sometimes leads to difficulty in forming scale within a reasonable period. Accordingly, the scale formation is sometimes induced with salts. In some cases, 0.1% to 10% NaCl, KCl or $MgCl_2$ salts are added to induce particular scale formation. These crude samples contained 28% and 69% $P_2O_5$ from Plant A, 30% and 54% $P_2O_5$ from Plant P and 30% $P_2O_5$ from Plant M. These samples are used as is or diluted to proper concentration by adding water, or adjusted to more concentrated solution by adding 86% commercial grade phosphoric acid. In some cases, 0.1% to 3% NaCl, KCl or $MgCl_2$ salts are also added to induce particular scale formation during testing.

Scale was induced in the following manner:

Step 1: Acid preparation—In this step, crude phosphoric acid is obtained from phosphoric acid plants and is treated properly (as is, diluting, concentrating or adding salt as scale initiator) before placing into the jacket beakers (60° C. to 80° C.) for 0.5 to 2 hours.

Step 2: Testing equipments set up and chemical addition—After the treatment, proper dosages of the functional organic reagents are added to the phosphoric acid and agitated using stir bar while being heated by water circulator at 60° C. to 90° C. In the meantime, a 316 L stainless steel tube is placed in each beaker along with the cover and plastic tubings for water inlet and outlet. Alternatively, a graphite tube or a 904 L stainless steel tube can be used and the temperature for the tube can be 110° C. to 130° C.

Step 3: Scale formation—If a functional organic reagent to prevent or reduce scale is used, it can be added just before the conditioning (generally the additive is used as a solution containing 1-10% of active reagent). This solution is put into the treated phosphoric acid in the jacketed beaker and is heated with agitation at 60° C. to 80° C. for 30 minutes before the tube waster is turned on and kept at that temperature for 2-12 hours. Two to nine such tests (beakers) are done at one time. At the end of the test, the tube is thoroughly rinsed and dried in an oven (80° C.) for 1-2 hours.

Step 4: Weighing and analysis of the scale—Considerable scale is observed to form on the steel tube. The weight gain of the steel tube is a measure of the amount of scaling. The weight of scale formed is expressed as a percentage of the average weight that formed on the blanks (i.e., no reagent is used) that were part of the same set of tests. Similarly, the total amount of scale is also a measure of antiscalant activity and this may be expressed as a percentage of the total weight that formed in the blank experiments that were part of the same set of tests. The scale is also analyzed by ICP and XRD for metal ion and component information.

This test method is preferred because other test methods collect both the scales and the insolubles, although the insoluble may be free flowing in the acid stream in the real plant and thus not contribute as significantly to the scale growth. In this test, the scale is collected on the outside surface of the stainless steel tubes. The tubes are weighed and compared to the tubes without reagent treatment to calculate the scale changes. The reagents are usually prepared in deionized ("DI") water for final of 3% concentration for testing. Unless it is stated otherwise, the concentration reagent in the testing solution is at a maximum of 2000 ppm.

Care must be taken to ensure all the parameters, such as but not limited to, mixing rate, tube temperature, jacket temperature, tube surface quality, tube volume submerged, stir bar size and acid quality, are close to one another, so that the result of scale inhibition comparison with the control sample will be meaningful.

Example 1

Four jacketed-beakers are positioned and clamped on top of an aluminum tray filled with DI-water over the four corners of the hot plates. The beakers are connected in parallel in respect to the water flow from the heating circulator. Phosphoric acid (synthetic or crude plant acid sample at 28%) is mixed well before evenly dividing into 4 beakers (450-700 g). The beakers are mixed simultaneously by stir bars at the same speed. The hot plate is turned on to heat the water bath to a temperature of about 90° C. After the mixing in each beaker is stabilized, the power of the heating circulator is started. Once the temperature of the circulator reads about 50-60° C., reagents are then added to the individual beaker (usually to three of them with remaining one as control).

The four pre-weighed U-shape tubes with series connection to tap water are then submerged into corresponding beaker. Once the circulator reads about 75° C., the tap water is turned on to cool the U-shape tubes. The end of the tap water temperature coming out of the last U-shape tube is about 25° C. The mixing in each beaker is continued and carefully monitored for occasional stops. All tap water and heating water connections are monitored frequently for possible leaking and disconnection.

After a two hour treatment (or until there is visible scale formed on the tubes), the heating for the jacket and cooling water for the tubes are turned off along with the stirring and heating for the hot plate. The tubes are disconnected and rinsed in a beaker with 500 ml DI water to remove the residual phosphoric acid on the tubes. The tubes are then dried in an oven for 1 hour at 80° C. and cooled to room temperature before they are weighed to find out scale weight on the tubes by the following equation: Percent scale reduction (increase) =100×(Wt of scale w/reagent−Wt of scale w/o reagent)/(Wt of scale w/o reagent). ICP analysis and XRD analysis is submitted when necessary.

After the scale study is complete, the beakers are removed with clamps attached and used acid solutions are poured into a waste container. The beakers are cleaned and returned to their original positions for the next run. The stainless steel tubes are cleaned, oven dried, and weighed before reused for the next run.

Results for various functional organic reagents for preventing or reducing scale are shown in Tables A-D below:

TABLE A

Test results using single-compound phosphonic acid derivative reagents

| Examples | Reagents | Dosage, mg/l | Scale change on Tube % vs. blank |
|---|---|---|---|
| 1 | Phenylphosphonic acid | 100 | −15 |
| 2 | phosphonoacetic acid | 100 | −53 |

TABLE B

Test results using single-compound sulfonic acid derivative reagents

| Examples | Reagent | Dosage, mg/l | Scale change on Tube % vs. blank |
|---|---|---|---|
| 3 | Sulfosuccinic acid | 100 | −92 |
| 4 | 3-Sulfopropyl acrylate potassium salt | 100 | −78 |
| 5 | 1-Dodecanesulfonic acid sodium salt | 100 | −72 |
| 6 | 4-Hydroxybenzenesulfonic acid solution | 100 | −66 |
| 7 | 3-Amino-4-hydroxybenzene-sulfonic acid | 100 | −27 |

TABLE C

Test results using single-compound carboxylic acid derivative reagents

| Examples | Reagent | Dosage, mg/l | Percent Scale change on Tube % vs. blank |
|---|---|---|---|
| 8 | 3,4-Dihydroxyphenylacetic acid | 100 | −58 |
| 9 | 3,4-Dihydroxybenzoic acid | 100 | −42 |
| 10 | Gallic acid | 100 | −10 |
| 11 | Caffeic acid | 100 | −17 |

TABLE D

Test results using blend or copolymers as reagents

| Examples | Reagent | Dosage, mg/l | Percent Scale inhibition on Tube % vs. blank |
|---|---|---|---|
| 12 | Phosphinopolycarboxylic acid | 100 | −9 |
| 13 | Acrylic acid/acrylate/sulfonate copolymer | 100 | −17 |
| 14 | allyl sulfonic acid/maleic anhydride copolymer | 100 | −58 |

TABLE D-continued

Test results using blend or copolymers as reagents

| Examples | Reagent | Dosage, mg/l | Percent Scale inhibition on Tube % vs. blank |
|---|---|---|---|
| 15 | (available as CYANAMER ® P-80 from Cytec Industries Inc.) poly(4-styrenesulfonic acid) | 100 | −2.5 |
| 16 | Tartaric acid + allyl sulfonic acid/maleic anhydride copolymer (available as CYANAMER ® P80 from Cytec Industries Inc.) (1:1) | 100 | −33 |
| 17 | 1-hydroxyethan-(1,1-di-phosphonic acid)(HEDP) + polyMA-AA (1:1) | 100 | −60 |
| 18 | 1-hydroxyethan-(1,1-diphosphoic acid) (HEDP) + polyacrylic acid (1:1) | 100 | −75 |
| 19 | 3,4-dihydroxyhydrocinnamic acid + allyl sulfonic acid/maleic anhydride copolymer (available as CYANAMER ® P80 from Cytec Industries Inc.) (1:1) | 100 | −35 |
| 20 | Sodium di-2-ethylhexyl sulfosuccinate (available as AeroDri ® 104 from Cytec Industries Inc. Woodland Park NJ) + polydimethylamine epichlorohydrin ethylenediamine (available as SUPERFLOC ® C573 from Cytec Industries Inc. Woodland Park NJ) (1:1) | 100 | −55 |
| 21 | Tartaric acid + poly-diallyl dimethyl ammonium chloride (available as SUPERFLOC ® C587 from Cytec Industries Inc. Woodland Park NJ) (1:1) | 100 | −33 |
| 22 | 3,4-dihydroxyhydrocinnamic acid + poly-diallyl dimethyl ammonium chloride (available as SUPERFLOC ® C587 from Cytec Industries Inc. Woodland Park NJ) (1:1) | 100 | −72 |
| 23 | 4,5-dihydroxynaphthalene-2,7-disulfonic acid sodium salt + acrylamide/acrylate co-polymer (available as CYANAMER ® P70 from Cytec Industries Inc. Woodland Park NJ) (1:1) | 100 | −52 |
| 24 | Blend of 70% petroleum sulfonate, 20% butoxypolypropylene glycol, and 10% water (available as Aero ® 865 from Cytec Industries Inc., Woodland Park NJ) + Tannic phosphite (1:1) | 100 | −66 |
| 25 | Sodium di-2-ethylhexyl sulfosuccinate (available as AeroDri ® 104 from Cytec Industries Inc. Woodland Park NJ) + poly-diallyl ammonium chloride (available as SUPER-FLOC ® C587 from Cytec Industries Inc. Woodland Park NJ) (1:1) | 100 | −29 |
| 26 | allyl sulfonic acid/maleic anhydride copolymer (available as CYANAMER ® P-80 from Cytec Industries Inc.) + poly-dimethylamine epichlorohydrin ethylenediamine (available as SUPERFLOC ® C-573 from Cytec Industries Inc. Woodland Park NJ) (1:1) | 100 | −42 |

Example 2

The testing condition is similar to that for Example 1, but the phosphoric acid concentration is increased to 52%. The test is performed with 55° C. tube temperature and 80° C. acid temperature or with 35° C. tube temperature and 70° C. acid temperature in order to increase the temperature difference to enhance scale formation. In all the tests, 240 rpm to 300 rpm agitation, 1 kg of acid and 100 ppm (3 g of 3% solution) reagents is used. The duration of the tests is between 2 to 6 hours.

Results are provided in Table E below:

Table E

Test results for various reagents at 52% $P_2O_5$

| Example | Reagent | Dosage, mg/l | Percent Scale inhibition |
|---|---|---|---|
| 27 | Tannic phosphite | 100 | −78% |
| 28 | Sulfosuccinic acid | 100 | −94% |
| 29 | 1-Dodecanesulfonic acid sodium salt with dopamine | 100 | −67% |
| 30 | 3,4-dihydroxyhydrocinnamic acid | 100 | −88% |
| 31 | hydroxypolyethylenimino succinate | 100 | −67% |

A typical experimental process for hydroxypolyethylenimino succinate is as following: 2 g disodium cis-epoxysuccinate was synthesized from known procedure and was mixed with 8.3 g 50% polyethylenimine (PEI) and heated (either neat or in $CH_3CN$) and stirred for 4 hr. at 80° C. After cooling, the viscous liquid was treated with hexanes after which it was solidified. It was filtered and dried and weighted. The solid was dissolved in water for concentration adjustment. The reagent testing results are summarized in Table F and reported as percent of scale formed versus blank, where no reagent is used.

TABLE F

Test results using hydroxypolyethylenimino succinate

| Examples | Reagent | Dosage, mg/l | Percent Scale inhibition on Tube % vs. blank |
|---|---|---|---|
| 32 | hydroxypolyethylenimino succinate | 100 | −97.5 |

Various patent and/or scientific literature references have been referred to throughout this application. The disclosures of these publications in their entireties are hereby incorporated by reference as if written herein to the extent that such disclosures are not inconsistent with the invention and for all jurisdictions in which such incorporation by reference is permitted. In view of the above description and the examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the processes as illustrated, may be made by those skilled in the art, without departing from the scope of the present teachings. Consequently, the scope of the present teachings should not be limited to the foregoing discussion, but should be defined by the appended claims.

We claim:

1. A method for preventing or reducing at least one species of scale in a wet-process phosphoric acid production process, the method comprising:
adding to at least one stage of the wet-process phosphoric acid production process a scale preventing or reducing amount of a reagent selected from the group consisting of
i) sulfonic acid or a compound having a sulfonic acid functional group selected from the group consisting of sulfosuccinic acid; 5-sulfosalicylic acid hydrate; 4-sulfophthalic acid; N-(1,1-dimethyl-2-hydroxyethyl)-3-amino-2-hydroxypropanesulfonic acid (AMPSO); 3-amino-4-hydroxybenzenesulfonic acid; 3-sulfopropyl acrylate potassium salt; 4-hydroxybenzenesulfonic acid solution; 4,5-dihydroxynaphthalene-2,7-disulfonic acid disodium salt; hydroquinonesulfonic acid potassium salt;
ii) a compound having a carboxylic acid functional group selected from the group consisting of 3,4-dihydroxyphenylacetic acid; 3,4-dihydroxyhydrocinnamic acid; 3,4-dihydroxybenzoic acid; gallic acid; caffeic acid; tartaric acid; and epoxysuccinic acid;
iii) a compound having a phosphite functional group;
iv) a copolymer comprising a first component chosen from (i)-(iii) and one or more second component that is a copolymer or polymer selected from the group consisting of polyethyleneimine; acrylamide/acrylate copolymer; allyl sulfonic acid/maleic anhydride copolymer; poly-dimethylamine epichlorohydrin ethylenediamine, poly-diallyl dimethyl ammonium chloride; poly(4-styrenesulfonic acid); acrylic acid/acrylate/sulfonate co-polymer; polyacrylic acid (PAA); sodium polyacrylate (PARS); methoxyphenyl maleamic acid (MPMA); maleic anhydride acrylic acid polymer (MA-AA); AA-MA-acrylamido-methyl-propane sulfonate polymer (AMPS) hypophosphorous acid quadripolymer; AA-AMPS multipolymer; AA-acrylate copolymer T-225; and acrylic acid-2-methyl propanesulfonic acid acrylic polymer; and
v) a reagent blend comprising at least two reagents selected from subgroups (i)-(iv).

2. A method according to claim 1, wherein the species of phosphoric acid scale is selected from the group consisting of $Si_2F_6$; $Na_2SiF_6$; $K_2SiF_6$; $CaSiF_6+2\ H_2O$; $CaF_2$; $MgF_2$; $CaSO_4+2\ H_2O$; $MgSiF_6+6\ H_2O$; $Mg_{0.8}Al_{1.5}F_6+X\ H_2O$, wherein X is an integer ranging from 2 to 10; $MgH_2P_6O_7$; $CaSO_4$; $Al(PO_3)_3$; $NaK_2AlF_6$; $Ca_3(AlF_6)_2+4\ H_2O$; $MgNaAlF_6+2\ H_2O$; and $Ca_4SO_4AlSiF_{13}+10\ H_2O$.

3. A method according to claim 1, wherein the adding step occurs at one or more stages selected from the group consisting of the milling stage; the digesting stage; the filtering stage; the clarifying stage; and the condensation/evaporation stage of the phosphoric acid production process.

4. A method according to claim 1, wherein the adding step is performed in a single stage, in multiple stages, sequentially, in reverse order, simultaneously, or in combinations thereof.

5. A method according to claim 1, wherein the reagent is selected from the group consisting of tannic phosphite; sulfonic acid; sulfosuccinic acid; 5-sulfosalicylic acid hydrate; N-(1,1-dimethyl-2-hydroxyethyl)-3-amino-2-hydroxypropanesulfonic acid (AMPSO); 3-sulfopropyl acrylate potassium salt; 4-hydroxybenzenesulfonic acid solution; 4,5-dihydroxynaphthalene-2,7-disulfonic acid disodium salt; 3,4-dihydroxyphenylacetic acid; 3,4-dihydroxyhydrocinnamic acid; 3,4-dihydroxybenzoic acid; tartaric acid; polyethyleneimine -epoxy-hydroxysuccinate; a 1:1 blend of 3,4-dihydroxyhydrocinnamic acid and poly-diallyl dimethyl ammonium chloride; and mixtures thereof.

6. A method according to claim 5, wherein the reagent is sulfosuccinic acid.

7. A method according to claim 5, wherein the reagent is 3-sulfopropy acrylate potassium salt.

8. A method according to claim 5, wherein the reagent is a 1:1 blend of 3,4-dihydroxycinnamic acid and poly-diallyl dimethyl ammonium chloride.

9. A method according to claim 5, wherein the reagent is tannic phosphite.

10. A method according to claim 5, wherein the reagent is 3,4-dihydroxycinnamic acid.

11. A method according to claim 5, wherein the reagent is hydroxypolyethyleneimino succinate.

12. A method according to claim 1, wherein the concentration of the reagent is from 10 to 1000 g per ton of phosphoric acid.

13. A method according to claim 12, wherein the concentration of the reagent is 100 g per ton of phosphoric acid.

14. A method according to claim 1, wherein the scale is prevented or reduced for a period of time from 10 to 180 days.

* * * * *